United States Patent [19]

Notaro

[11] 4,239,827
[45] Dec. 16, 1980

[54] FLAME-SPRAYED THERMOPLASTIC SUBSTRATE IS COATED WITH AN ADHESIVE LAYER WHICH BONDS PARTICLES OF AN ADSORBENT LIKE CARBON TO THE SUBSTRATE

[75] Inventor: Frank Notaro, Amherst, N.Y.

[73] Assignee: Union Carbide Corporation, New York, N.Y.

[21] Appl. No.: 3,601

[22] Filed: Jan. 15, 1979

[51] Int. Cl.³ .................. B05D 1/08; B05D 1/10; B65D 11/16; B65D 11/20; B65D 85/70

[52] U.S. Cl. .................. 428/35; 55/387; 220/425; 220/456; 220/457; 220/469; 220/DIG. 9; 427/423; 428/143; 428/323; 428/337; 428/339; 428/414; 428/416; 428/448; 428/451; 428/461; 428/538

[58] Field of Search .......... 427/423; 428/35, 143, 428/323, 337, 339, 414, 416, 448, 451, 461, 538; 220/425, 456, 457, 469, DIG. 9

[56] References Cited

U.S. PATENT DOCUMENTS

| 3,296,773 | 1/1967 | Hemstreet | 55/27 |
|---|---|---|---|
| 3,436,248 | 4/1969 | Dittrich et al. | 427/423 |
| 3,598,635 | 8/1971 | Sagona | 427/423 |
| 3,607,343 | 9/1971 | Longo et al. | 427/423 |
| 3,617,358 | 9/1971 | Dittrich | 427/423 |
| 3,637,437 | 1/1972 | Goldberger | 428/52 |
| 3,655,425 | 4/1972 | Longo et al. | 427/423 |
| 3,791,863 | 2/1974 | Quirk | 427/423 |
| 3,811,934 | 5/1974 | Glaser | 427/423 |
| 3,932,143 | 1/1976 | Marshall et al. | 427/423 |
| 3,955,534 | 5/1976 | Brown | 427/423 |

FOREIGN PATENT DOCUMENTS 1287733 9/1972 United Kingdom .
1388733 3/1975 United Kingdom .

Primary Examiner—James C. Cannon
Attorney, Agent, or Firm—Steven J. Hultquist; John J. Kelly, Jr.

[57] ABSTRACT

The thermoplastic polymeric surface to be adhesively bonded is flame-sprayed with a material having a surface free energy which is greater than the surface free energy of the thermoplastic polymeric surface. In a specific application of the invention, a particulate coating is formed on the thermoplastic polymeric surface by flame spraying the surface with a material selected from the group consisting of carbon, ceramics, metal, metal oxides, metal alloys, and mixtures thereof. An adhesive coating is applied to the flame-sprayed surface, following which particulate material is applied to the adhesive-coated substrate to form the particulate coating.

15 Claims, 3 Drawing Figures

4,239,827

FLAME-SPRAYED THERMOPLASTIC SUBSTRATE IS COATED WITH AN ADHESIVE LAYER WHICH BONDS PARTICLES OF AN ADSORBENT LIKE CARBON TO THE SUBSTRATE

FIELD OF THE INVENTION

The present invention relates generally to a method of treating a thermoplastic polymeric surface to enhance the adhesive bondability of same, and more specifically to a method of forming a particulate coating on a thermoplastic polymeric surface and to an article of manufacture produced thereby.

BACKGROUND OF THE INVENTION

Due to their light weight, low cost and ease of forming, thermoplastic polymeric materials have been widely used in the fabrication of liquid containers and vessels. More specifically, the prior art has proposed that thermoplastic polymeric materials be used as materials of construction for double-walled containers of the type in which spaced-apart inner and outer wall members enclose a sealed insulation space in which low pressure or vacuum conditions are maintained for enhancement of the insulation quality afforded by the inter-wall space. To maintain the requisite low pressure or vacuum conditions in the insulation space, the prior art has typically employed sorbent materials such as physical adsorbents and getters to take up gases resulting from permeation of gas through the wall members of the insulation space and gas leakage through wall member joints in communication with the insulation space, as well as evolution of gases from the materials of construction of the insulation space.

More recently, it has been found that in double-walled containers of the above-described type, wherein either or both of the inner and outer wall members or portions thereof are formed of thermoplastic polymeric materials, solid physical adsorbent materials can be effectively utilized if such materials are disposed in the insulation space in thermal contact with the wall member forming the container receptacle, when such container is employed for storage and dispensing of cryogenic liquid. In use, the introduction of cryogenic liquid into the container receptacle effects cooling of the wall member bounding the insulation space and the adsorbent material in the insulating space in thermal contact with such wall member, thereby substantially increasing the sorptive affinity of the adsorbent material for gas constituents in the insulation space. In one particularly advantageous arrangement, a thermoplastic polymeric wall member is employed to form the receptacle for cryogenic liquid, with the side of such wall member bounding the insulation space being provided with a layer of pellets of adsorbent, e.g., activated carbon, thereon. In such container construction, the pellets of adsorbent may simply be bonded to the thermoplastic polymeric wall member with an adhesive such as epoxy if the wall member is molded or otherwise formed in a manner which provides a suitable surface for adhesive bonding—i.e., a surface to which the pelleted adsorbent mass will remain adhesively joined, despite cooling of the wall member to cryogenic temperature and subsequent warmup to ambient temperatures. Unfortunately, however, injection molding of the thermoplastic polymeric wall members, such as may desirably be employed, in view of its adaptability to mass production, achievement of close dimensional tolerances on the molded article and production of articles of uniform physical and chemical characteristics, generally produces finished articles having surfaces which are extremely smooth in character and may be unsuitable as substrates for adhesively bonding the adsorbent pellets to the wall surface. This is particularly true where the thermoplastic polymeric material has an intrinsically low surface free energy and is chemically inert so as to be unamenable to chemical etching of the surface, as for example is characteristic of polyethylene and polypropylene.

Accordingly, it is an object of the present invention to provide a method of treating a thermoplastic polymeric surface to enhance the adhesive bondability of same.

It is another object of the present invention to provide an improved method of forming a particulate coating on a thermoplastic polymeric surface.

It is still another object of the invention to provide a thermoplastic polymeric article to which pellets of adsorbent material are strongly adhesively bonded.

Other objects and advantages of this invention will be apparent from the ensuing disclosure and appended claims.

SUMMARY OF THE INVENTION

This invention relates generally to a method of treating a thermoplastic polymeric surface to enhance the adhesive bondability of same, and more specifically to a method of forming a particulate coating on a thermoplastic polymeric surface and to an article of manufacture produced thereby.

In the broad method aspect of the present invention, wherein a thermoplastic polymeric surface is treated to enhance the adhesive bondability of same, the thermoplastic polymeric surface is flame sprayed with a material having a surface free energy which is greater than that of the thermoplastic polymeric surface.

In a more specific method aspect of the invention, a coating of carbon pellets is formed on a thermoplastic polymeric surface by flame spraying a material selected from the group consisting of carbon, ceramics, metals, metal oxides, metal alloys, and mixtures thereof, onto the thermoplastic polymeric surface. An adhesive coating is applied to the flame-sprayed thermoplastic polymeric surface. To the adhesive-coated, flame-sprayed thermoplastic polymeric surface a layer of carbon pellets is applied, whereby carbon pellets in the layer are bonded by the adhesive coating to the flame-sprayed thermoplastic polymeric surface, to form the aforementioned coating of carbon pellets thereon.

Another aspect of the invention relates to a thermoplastic polymeric article having a surface flame-sprayed with a material selected from the group consisting of carbon, ceramics, metals, metal oxides, metal alloys, and mixtures thereof, with a substantially single pellet layer of activated carbon pellets adhesively bonded to the flame-sprayed surface.

As used herein, the term "particulate" refers to particle-form materials, i.e., materials of unaggregated grains or granules, as well as to pellet-form materials, i.e., materials in the form of aggregated particle bodies.

DESCRIPTION OF THE PREFERRED EMBODIMENTS

Figure 1:
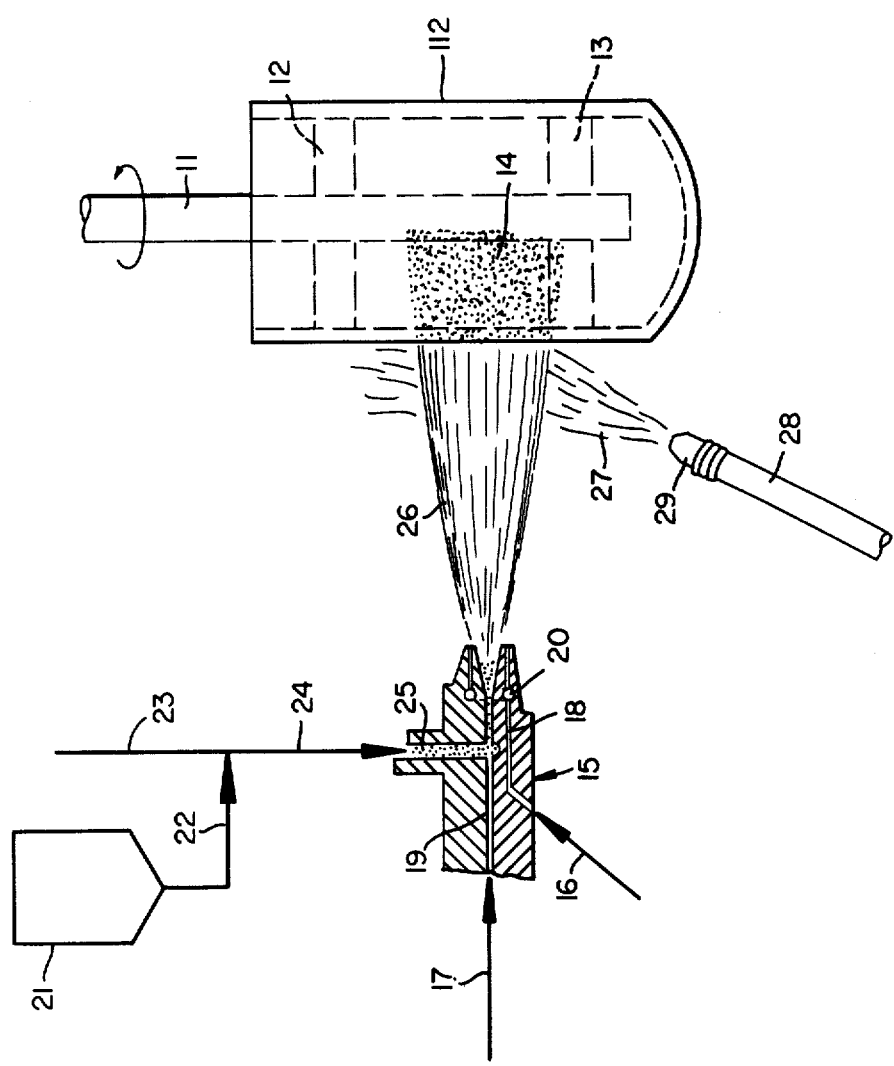
FIG. 1 is a schematic drawing of a flame-spraying arrangement such as may usefully be employed in the practice of the present invention.
Figure 2:
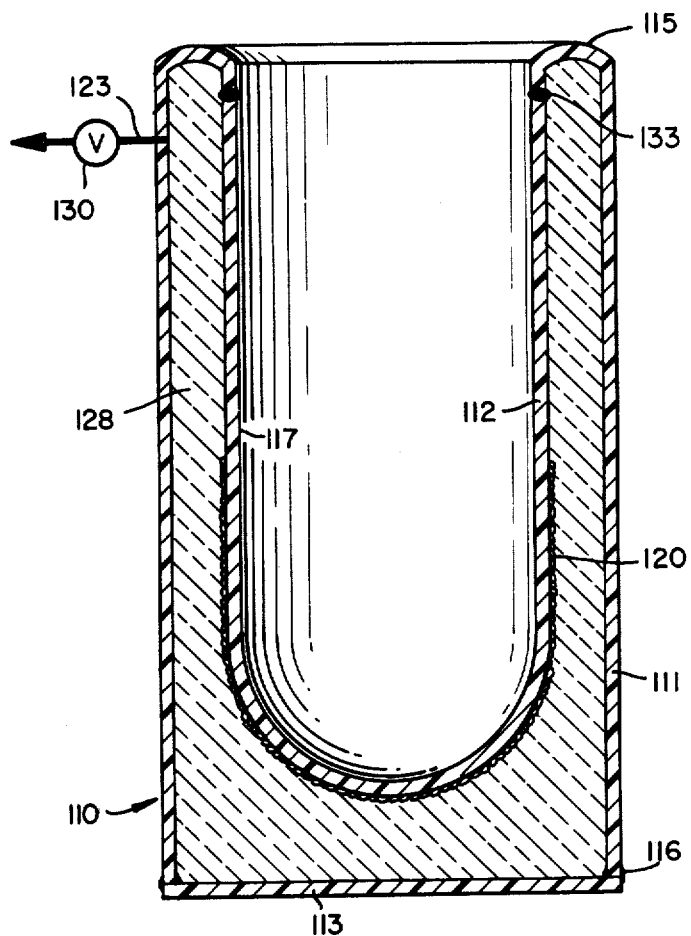
FIG. 2 is a sectional elevational view of a double-walled container for storage and dispensing of cryogenic liquid comprising an inner wall member coated in accordance with the method of the present invention.
Figure 3:
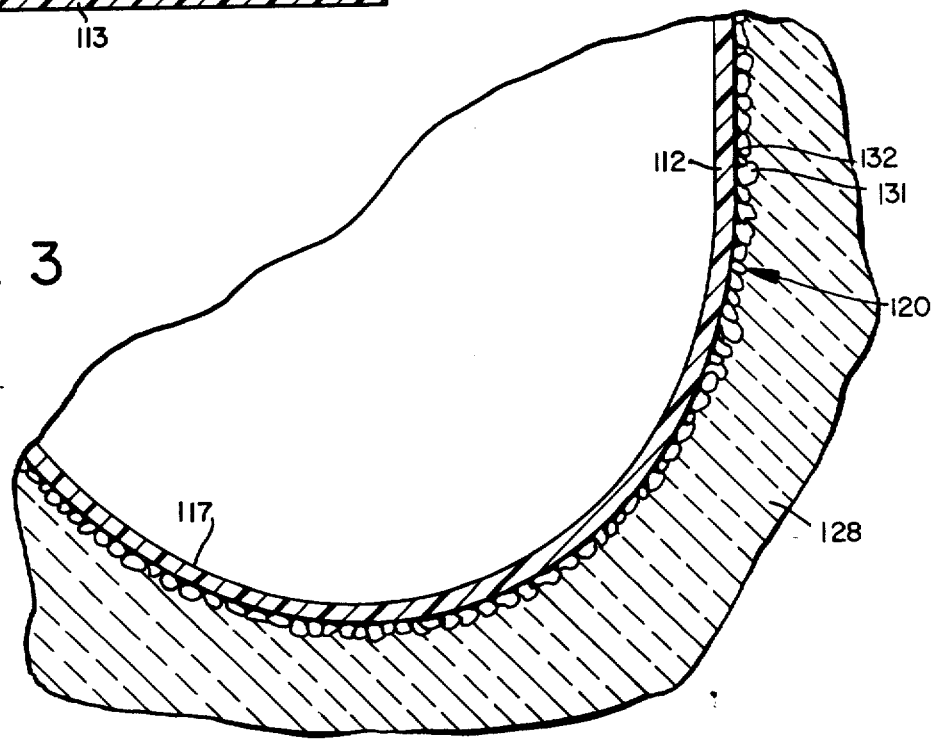
FIG. 3 is a sectional, elevational view of a portion of the cryogenic liquid container of FIG. 2, showing the details of a layer of carbon pellets formed on the inner wall member of the container.

Referring now to the drawings, FIG. 1 shows a schematic drawing of an arrangement for flame-spraying such as may be usefully employed to carry out the method of the present invention. The thermoplastic polymeric surface employed in this arrangement is provided by the exterior surface of the thermoplastic polymeric wall member 112 which is subsequently employed in the cryogenic liquid container as shown in FIGS. 2 and 3 herein, described hereinafter in greater detail. The wall member 112 may be of any suitable thermoplastic polymeric material such as for example polyethylene or polypropylene. Although the present invention is directed to a method having particular utility in application to injection molded thermoplastic polymeric surfaces characterized by relatively low surface free energy values and by chemical inertness, such method is also applicable to all types of thermoplastic polymeric surfaces, however formed. As used herein, "thermoplastic polymeric materials" include any synthetic or semi-synthetic condensation or polymerization product capable of being shaped by the application of heat and pressure. Illustrative materials include polystyrene, polypropylene, polyamides, acrylics, polyethylene, polyvinyl chloride, polytetrafluorethylene and polychlortrifluoroethylene.

As indicated above, the method of the present invention has particular utility in application to thermoplastic polymeric materials characterized by relatively low surface free energy values and by chemical inertness, due to the inherent unsuitability of such materials as substrates for strong adhesive bonding. Thermoplastic polymeric materials with relatively low surface free energy values, e.g., below about 50 dynes/cm., when employed as substrates for adhesive bonding, generally do not maintain good bond integrity when the substrate is warmed or cooled over a substantial temperature range, so that differential thermal expansion or contraction tends to cause the interfacial bond between the thermoplastic polymeric substrate and the adhesive to rupture. Nonetheless, this disadvantageous low surface free energy characteristic of certain thermoplastic polymeric materials may be overcome if the material is chemically reactive so as to be treatable with a chemical etching medium. Chemical etching in such instance is employed to produce a treated surface of the thermoplastic polymeric substrate which is so textured as to promote strong bonding between the substrate and the adhesive medium applied thereto. However, many thermoplastic polymeric materials, e.g., polyethylene and polypropylene, are chemically inert in addition to possessing the aforementioned relatively low surface free energy values and thus are not amenable to surface preparation by chemical etching, and it is to such materials that the method of the present invention may particularly usefully be applied.

The wall member 112 in the FIG. 1 arrangement is mounted for rotation about its cylindrical axis on a rotating shaft 11 having associated therewith laterally extending support members 12 and 13 which engage the inner surface of wall member 112 for rigidly retaining the wall member in position during the flame spraying operation.

Flame spraying as heretofore conventionally practiced has involved generation of a stream of heated fusible metal or ceramic material in the form of a particulate spray and direction of such spray onto a substrate having a higher melting point than the flame sprayed material, for deposition of the flame-sprayed material thereon. The material to be flame sprayed may for example be introduced to a flame spraying gun in the form of granules or powders. For such purpose, the granules or powder may be introduced to the gun in the form of a dispersion of solids in a carrier gas which is then introduced into a flame produced by combustion of oxygen and fuel gases to provide a directed gas stream containing combusted and burning gases in which the dispersed particles are directed toward the substrate to be coated in the aforementioned manner. Another commonly employed method of flame spraying utilizes a metal wire feed to the flame spraying gun, with the wire being melted by a flame or electric arc and the resulting molten metal being "atomized" in the form of fine droplets in a jet of gas.

In contrast to the above-described conventional practice wherein a fused coating of metal or ceramic is applied to a substrate having a higher melting point than the coating material being sprayed, the present invention is based on the discovery that thermoplastic polymeric materials may advantageously be flame sprayed with a material having a higher melting point than the substrate material to enhance the adhesive bondability of the substrate surface. In general practice of the invention, the thermoplastic polymeric surface to be adhesively bonded is first flame-sprayed with a material having a surface free energy which is higher than the surface free energy of the thermoplastic polymeric material. Flame spraying in the practice of the present invention requires heat-softening of the thermoplastic polymeric substrate to be treated in conjunction with inpingement of grains, particles, or droplets, etc. of the flame-sprayed material onto the heat-softened substrate. This flame spraying may be carried out using conventional powder-fed or wire-fed flame spraying guns or, alternatively, the flame spraying may be conducted with two separate guns—one comprising a torch for heat only and the other a cool spraying device for granules or powder.

As used herein, "surface free energy" has its usual meaning of the amount of work expended isothermally per unit increase of interfacial area of the given material, typically measured in units of dynes/cm. Surface free energy values are generally available in the open literature for most materials of interest. As a general principle, the majority of thermoplastic polymeric materials have relatively low surface free energies on the order of less than 100 dynes/cm.; for example, polyethylene has a surface free energy of approximately 13 dynes/cm. (measured at 25° C.). By contrast, preferred flame spray materials in the present invention, such as carbon ceramics, metals, metal oxides, metal alloys, and mixtures thereof, have surface free energies which are much higher than the surface free energies of thermoplastic polymeric materials; most metals, for example, have surface free energy values on the order of 1000—1500 dynes/cm. (as measured at 25° C.).

In the general practice of the invention, suitable flame spray materials may be identified by the above-indicated procedure of comparing surface free energy values for a given flame spray material candidate with that of the specific thermoplastic polymeric substrate to be flame sprayed. Alternatively, if tabulated surface free energy values are not available or if surface free energy values are not readily empirically determined, the contact angles of a wetting liquid may be measured on a surface of the thermoplastic polymeric substrate and on a surface of the material of which the flame spray medium is formed, both measurements being made with the same wetting liquid and at the same conditions including temperature and pressure. From such measured contact angle values, suitable flame spray media can be identified as having a lower contact angle than that measured for the thermoplastic polymeric surface to be flame sprayed, since, all else being equal, the contact angle of the same wetting liquid will tend to decrease as surface free energy increases. Thus, a flame spray material having a higher surface free energy than the surface free energy of the thermoplastic polymeric material will also have a contact angle which is lower than the corresponding contact angle measured for the thermoplastic polymeric material. Various suitable methods for measurement of contact angles are identified in A. Ferguson, *Proc. Phys. Soc. (London)* 53, 554 (1941).

In the preferred practice of the invention, a material, selected from the group consisting of carbon, ceramics, metals, metal oxides, metal alloys, and mixtures thereof, is flame sprayed onto a thermoplastic polymeric surface to form a treated surface which provides an excellent substrate for subsequent adhesive bonding. In one preferred application of the present invention, the flame-sprayed thermoplastic polymeric surface is coated with adhesive and thereafter with pellets of adsorbent material to provide a highly effective arrangement of the adsorbent for maintenance of low pressure in the insulation space of a cryogenic liquid container, as hereafter described in greater detail.

The method of this invention thus utilizes flame spraying to imbed the flame sprayed material in the thermoplastic polymeric surface which is to be ultimately adhesively bonded. The composite surface produced by such method is characterized by higher surface energy and a roughened texture which may be particularly usefully employed to produce a tenacious bond between a layer of particulate material applied to the flame-sprayed surface and the underlying thermoplastic polymeric body.

The flame spraying means in the FIG. 1 arrangement includes a flame spray gun 15 to which is introduced a dispersion of particles of a material, selected from the group consisting of carbon, ceramics, metals, metal oxides, metal alloys, and mixtures thereof, in an inert carrier gas from line 24. The dispersion of particles in line 24 is formed by admixture of the flame spray material, in powdered or granulated form as supplied from hopper 21 and line 22, with the inert gas carrier gas from line 23 connected to an inert gas source (not shown). From line 24, the dispersion of solid particles in the inert carrier gas is introduced to the flame spray gun 15 through passage 25 which communicates with the central channel 19 of the gun. At the rear portion of channel 19, oxygen gas is introduced from line 17 for combustion with fuel gas such as hydrogen, introduced to the flame spray gun in line 16 and flowed therefrom through channel 18 to nozzle reservoir 20 from which the oxygen and fuel gas combustion mixture issues at the nozzle of the gun. The combustion of the oxygen and fuel gases produces a flame and provides a directed gas stream containing combusted and burning gases. By way of example, the method of the invention has been carried out with hydrogen as the fuel gas, introduced to the flame spray gun at a flow rate of about 315 cu. ft./hr. while oxygen is introduced at a flow rate of 54 cu. ft./hr.

The introduction of the above-described dispersion of particles in inert carrier gas from passage 25 into the directed gas stream containing combusted and burning gases provides a flame spray 26 of such particles. In such manner, the material supplied to the gun from hopper 21 is flame sprayed onto the rotating thermoplastic polymeric surface 112 to form a flame sprayed coating 14 thereon. Although the thermoplastic polymeric surface 112 is shown in FIG. 1 embodiment as being rotated in connection with the provision of a stationarily positioned flame spraying gun 15, it is to be recognized that the surface to be flame sprayed could be stationarily positioned with movement of the flame spraying gun to provide the desired coating 14 on the thermoplastic polymeric surface.

The inert carrier gas introduced into the system in line 23 may suitably comprise nitrogen, as may the cooling gas 27 which is directed by conduit 28 and nozzle 29 onto the surface being flame sprayed, for cooling of the thermoplastic polymeric surface. Conduit 28 may thus be connected to the same source of inert gas as is introduced into the system as carrier medium for the flame spray material supplied from hopper 21 via line 22. In some applications of the present invention, the convective cooling of the thermoplastic polymeric surface being flame sprayed may not be necessary, however, such cooling may be desirable where the flame sprayed surface is associated with low material thicknesses, such as employed in the cryogenic liquid container hereinafter described, so as to prevent deformation of the thermoplastic polymeric surface during the flame spraying operation.

In one preferred application of the invention, wherein the thermoplastic polymeric surface is formed of polyethylene or polypropylene, the flame spray material may suitably comprise copper in the form of a powder. A particularly preferred copper powder for use with polyethylene or polypropylene surfaces has an average particle size of from 170 to 325 mesh. Carbon is also a preferred flame spray material for use with polyethylene or polypropylene surfaces, and may also be supplied in the form of a powder. In the preferred practice of the invention, the thermoplastic polymeric surface is desirably associated with a thermoplastic polymeric body of at least 0.030 inch thickness, as measured perpendicularly with respect to such surface, so as to minimize surface cooling requirements and the possibility of substrate deformation during the flame spraying step. In addition, it has been found generally advantageous in the practice of the invention to generate the flame spray (at the nozzle of the flame spraying gun) at a distance of from 13 to 15 inches from the thermoplastic polymeric surface; such separation distance has been found particularly useful in flame-spraying polyethylene surfaces with copper and carbon powders.

After the flame-spraying step has been completed, the flame-sprayed surface may be adhesively bonded as suitable for the desired end use of the flame-sprayed member. In the specific application of the invention wherein the flame-sprayed surface is associated with a wall member of a double-walled cryogenic liquid container, an adhesive such as an epoxy may be applied to the flame-sprayed thermoplastic polymeric surface. After application of the adhesive coating to the flame-sprayed surface, a layer of particulate adsorbent material such as activated carbon is applied to the adhesive-coated, flame-sprayed thermoplastic polymeric surface, whereby particulate bodies in the layer are bonded by the adhesive to the flame-sprayed thermoplastic polymeric surface, to form the desired particulate adsorbent coating thereon.

By the method of the present invention, a thermoplastic polymeric article can be produced having a surface flame-sprayed with a material, selected from the group consisting of carbon, ceramics, metals, metal oxides, metal alloys, and mixtures thereof, with a substantially single pellet layer of activated carbon pellets adhesively bonded to the flame-sprayed surface. In the flame-spraying arrangement shown illustratively in FIG. 1, such thermoplastic polymeric article comprises a wall member which may suitably be employed to form an enclosed double-walled insulation space in a cryogenic liquid container, as described below.

FIG. 2 is sectional elevational view of a cryogenic liquid container of the type disclosed and claimed in copending application Ser. No. 003,602 entitled "Container for Cryogenic Liquid", filed Jan. 15, 1979 in the names of M. F. Patterson et al. The container 110 employs an enclosed double-walled insulation space 128 bounded by a thermoplastic polymeric inner wall member 112, wherein the surface of the inner wall member coated with pellets of activated carbon 120 is disposed interiorly in the insulation space 128. In this container, the inner wall surface 117 of inner wall member 112 forms a receptacle for cryogenic liquid. The outer wall member comprises a side wall portion 111, bottom portion 113 joined to the side wall portion at joint 116 and top wall portion 115 joined to the inner wall member 112 by joint 133. Joints 116 and 133 may suitably be formed by ultrasonic or induction welding or any other suitable plastics joining method conventionally employed in the art. As shown, the insulation space 128 is filled with an insulation medium, which may suitably comprise a conventionally available powder insulation or a multilayered insulation material comprising radiation shields interposed between layers of fibrous thermal insulation.

The container shown in FIG. 2 employs the layer of activated carbon pellets 120 on the outer surface of the inner wall member 112 to take up gases from the insulation space 128 when the container receptacle is filled with cryogenic liquid. Filling the container with cryogenic liquid causes the inner wall member 112 and adsorbent pellets bonded thereto to be deeply chilled so as to substantially increase the sorptive affinity of the adsorbent for gases present in the insulation space 128. Subsequently, when the container is emptied of cryogenic liquid, the inner wall member 112 and layer of carbon adsorbent 120 in thermal contact therewith warms to ambient temperature, causing the adsorbent to release the gas previously adsorbed so that the gas pressure in the insulation space rises. If this pressure rises above the gas pressure of the exterior environment of the container, the over-pressure in the insulation space will be progressively relieved by permeation of gas through the gas-permeable thermoplastic polymeric wall portions of the container, with any substantial pressure rise above the capacity of the permeable wall member portions to accommodate via permeation from the insulation space 128 to the exterior environment of the container being relieved by the pressure relief valve 130 disposed in conduit 123 joining the insulation space with the container exterior environment. In this manner, the adsorbent 120 functions in use, i.e., when the container is filled with cryogenic liquid, to reduce the gas pressure in the insulation space 128 to low levels such as are desirable to enhance the insulation quality of the insulation space and thereby reduce heat leak and evaporative losses of cryogenic liquid from the container. Subsequently, when the container is emptied of cryogenic liquid and taken out of service, gas desorbing from the carbon adsorbent is passed out of the insulation space through permeable portions of the walls enclosing the insulation space and, if necessary, via the pressure relief valve 130.

The preferred adsorbent 120 in the FIG. 2 container is pelletized activated carbon having a minimum bulk density (i.e., the density of the adsorbent layer including void space between adjacent pellets) of 20 lbs. cu. ft. A suitable pellet size is 6–10 mesh. In preferred practice, the bonded pellets in the adsorbent layer do not protrude outwardly from the substrate more than 0.15 inch in order that the total pellet can be rapidly chilled to substantially substrate temperature when the container is placed in service to hold cryogenic liquid.

FIG. 3 is a sectional, elevational view of a portion of the cyrogenic liquid container of FIG. 2, showing the details of the layer of adsorbent pellets formed on the outer surface of the inner wall member 112 by the method of the present invention. As shown, the layer of adsorbent 120 comprises pellets 131 which are bonded to the flame-sprayed outer surface of the inner wall member 112 by bonding medium 132.

Although preferred embodiments of the invention have been described in detail, it is contemplated that modification of the method and article as disclosed may be made and some features may be employed without others, all within th spirit and scope of the invention.

What is claimed is:

1. A thermoplastic polymeric wall member having a surface flame-sprayed with a material selected from the group consisting of carbon, ceramics, metals, metal oxides, metal alloys, and mixtures thereof, with a substantially single pellet layer of activated carbon pellets adhesively bonded to the flame-sprayed surface.

2. An enclosed double-walled insulation space bounded by a thermoplastic polymeric wall member according to claim 1, wherein the activated carbon-coated surface is disposed interiorly in the insulation space.

3. A method of forming a particulate coating on a thermoplastic polymeric surface, comprising the steps of:
  (a) flame spraying said thermoplastic polymeric surface with a material having a surface free energy which is greater than that of said thermoplastic polymeric surface;
  (b) applying adhesive to the flame-sprayed thermoplastic polymeric surface; and (c) applying a particulate material to the adhesive-applied, flame-sprayed thermoplastic polymeric surface, whereby said particulate material is adhesively bonded to the flame-sprayed surface to form said particulate coating thereon.

4. A method according to claim 3 wherein said particulate material of step (c) comprises an adsorbent material.

5. A method according to claim 4 wherein said adsorbent material is activated carbon.

6. A method of forming a coating of carbon pellets on a thermoplastic polymeric surface, comprising the steps of:
 (a) flame spraying a material selected from the group consisting of carbon, ceramics, metals, metal oxides, metal alloys, and mixtures thereof, onto said thermoplastic polymeric surface;
 (b) applying an adhesive coating to the flame-sprayed thermoplastic polymeric surface; and
 (c) applying a layer of carbon pellets to the adhesive-coated, flame-sprayed thermoplastic polymeric surface, whereby carbon pellets in said layer are bonded by said adhesive coating to said flame-sprayed thermoplastic polymeric surface, to form said coating of carbon pellets thereon.

7. A method according to claim 6 wherein said flame sprayed material of step (a) is copper.

8. A method according to claim 7 wherein said copper powder has an average particle size of from 170 to 325 mesh.

9. A method according to claim 6 wherein said thermoplastic polymeric surface is associated with a thermoplastic polymeric body of at least 0.030 inch thickness as measured perpendicularly with respect to said surface.

10. A method according to claim 6 wherein the flame spray of step (a) is generated at a distance of from 13 to 15 inches from said thermoplastic polymeric surface.

11. A method according to claim 6 wherein said thermoplastic polymeric surface is formed of polyethylene.

12. A method of forming a coating of carbon pellets on a thermoplastic polymeric surface, comprising the steps of:
 (a) forming a dispersion of particles of a material selected from the group consisting of carbon, ceramics, metals, metal oxides, metal alloys, and mixtures thereof, in an inert carrier gas;
 (b) combusting oxygen and fuel gases to produce a flame and provide a directed gas stream containing combusted and burning gases;
 (c) introducing said dispersion of particles in inert carrier gas into said directed gas stream of step (b) to provide a flame spray of said particles;
 (d) positioning said thermoplastic polymeric surface such that said flame and directed gas stream is generated at a distance of from 13 to 15 inches from said thermoplastic polymeric surface and with said gas stream being directed at said thermoplastic polymeric surface, to flame spray a coating of said particles onto said surface;
 (e) applying an adhesive coating to said flame-sprayed thermoplastic polymeric surface; and
 (f) applying a layer of carbon pellets to the adhesive-coated, flame-sprayed thermoplastic polymeric surface, whereby carbon particles in said layer are bonded by said adhesive coating to said flame-sprayed thermoplastic polymeric surface, to form said coating of carbon pellets thereon.

13. A method according to claim 12 wherein said adhesive coating comprises an epoxy material.

14. A method of forming a coating of pelleted material on a thermoplastic polymeric surface, comprising the steps of:
 (a) flame spraying a material, selected from the group consisting of carbon, ceramics, metals, metal oxides, metal alloys, and mixtures thereof, onto said thermoplastic polymeric surface;
 (b) applying an adhesive coating to the flame-sprayed thermoplastic polymeric surface; and
 (c) applying a layer of said pelleted material to the adhesive-coated, flame-sprayed thermoplastic polymeric surface, whereby pellets in said layer are bonded by said adhesive coating to said flame-sprayed thermoplastic polymeric surface, to form said coating of pelleted material thereon.

15. A polyethylene article having a surface coated in accordance with the process of claim 12 or 14.

* * * * *